(12) United States Patent
Dippl et al.

(10) Patent No.: US 7,425,094 B2
(45) Date of Patent: Sep. 16, 2008

(54) APPARATUS FOR DETECTING POSITION AND FORMAT OF A FILM CASSETTE

(75) Inventors: Thomas Dippl, Pressath (DE); Bernhard Schukalski, Bayreuth (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 10/869,216

(22) Filed: Jun. 15, 2004

(65) Prior Publication Data

US 2004/0258209 A1   Dec. 23, 2004

(30) Foreign Application Priority Data

Jun. 17, 2003   (DE) .............................. 103 27 268

(51) Int. Cl.
   *G03C 5/16*   (2006.01)
(52) U.S. Cl. .................... 378/167; 378/181; 378/182
(58) Field of Classification Search ................ 378/167, 378/172, 173, 177, 205, 206, 181–188; 250/580–591, 250/475.2; 901/35, 44, 46, 47; 367/118, 367/129; 29/712; 33/706; 414/935–941, 414/900
See application file for complete search history.

(56) References Cited

U.S. PATENT DOCUMENTS

| | | | | |
|---|---|---|---|---|
| 4,416,020 A | * | 11/1983 | Wagner et al. | 378/181 |
| 4,836,671 A | * | 6/1989 | Bautista | 356/3.1 |
| 4,896,343 A | * | 1/1990 | Saunders | 378/95 |
| 5,317,388 A | * | 5/1994 | Surka et al. | 356/614 |
| 5,815,549 A | * | 9/1998 | Schmitt | 378/175 |
| 6,821,017 B1 | * | 11/2004 | Tankersley | 378/207 |
| 6,894,261 B2 | * | 5/2005 | Castenmiller et al. | 250/208.1 |

FOREIGN PATENT DOCUMENTS

| | | |
|---|---|---|
| DE | 34 28 747 A1 | 2/1986 |
| DE | 43 32 428 A1 | 3/1995 |
| DE | 19733297 A1 * | 2/1999 |
| EP | 0 692 731 A1 | 7/1995 |
| EP | 0 814 372 A2 | 6/1997 |

* cited by examiner

*Primary Examiner*—Edward J. Glick
*Assistant Examiner*—John M. Corbett
(74) *Attorney, Agent, or Firm*—Brinks Hofer Gilson & Lione

(57) ABSTRACT

An apparatus configured for an insertion of a cassette comprises at least one distance sensor operably measuring in a contactless manner a distance from a corresponding location on the apparatus to the inserted cassette. An electronic evaluator is operably connected to the at least one distance sensor to receive at least one distance signal corresponding to distances measured by at least one distance sensor, such that the electronic evaluator generates a position signal, resulting from the at least one distance signal, which is dependent on a dimension and a position of the inserted cassette in the apparatus. A control unit is operably connected to the electronic evaluator such that the control unit receives the position signal from the electronic evaluator.

18 Claims, 2 Drawing Sheets

APPARATUS FOR DETECTING POSITION AND FORMAT OF A FILM CASSETTE

BACKGROUND

The invention relates to an apparatus for detecting a position and a format of a film cassette inserted into the apparatus, and in particular, to a drawer apparatus for an x-ray system adapted to receive an x-ray film cassette.

Drawer apparatuses, in particular, catapult frame drawers for x-ray film cassettes, are known. Catapult frame drawers are typically mounted in x-ray receptacle spaces in a manner similar to drawers. By pulling them out, a human operator or user can substantially quickly load film cassettes or take exposed film cassettes out. Simple, fast handling, which is often indispensable in the field of medical diagnosis, is made possible by such drawer-like systems.

Film cassettes exist in various formats and sizes, which are used depending on a targeted application. For instance, to take an x-ray of an extremity of a patient, a smaller film cassette may suffice, while for a chest film, a larger-area film cassette may be necessary. To make them adaptably flexible for many possible applications, catapult frame drawers are designed to be large enough to be suitable for many different cassette formats.

Taking an x-ray may require substantial, exact positioning of the film cassette in the catapult frame drawer. As such, mechanical guides may be provided to place or situate an inserted film cassette in a desired position. The film cassette positioning may be readily possible if film cassettes of the same format and size are used throughout. However difficulties in handling may arise when varying formats and sizes are used. First, the mechanical guides may need to be designed so flexibly that they can easily be adapted to various cassettes. The cassette adaptation may require additional handling steps in fitting the film cassette into the guides, which may make it complicated to change film cassettes quickly. Second, the format and size of an inserted film cassette cannot be seen by the operator from outside when the frame drawer is closed, and automatic detection is therefore desirable.

An x-ray apparatus with a holder for x-ray film cassettes that enables automatic detection of the cassette dimensions is known from German Patent Disclosure DE 34 28 747 A1. For detecting a length and width of the film cassette, two pivotable levers are provided, which are pressed by spring force against two side faces of the film cassette. Further, a respective position of the two pivotable levers at a given time may be dependent on dimensions of the inserted cassette and may be detected via adjustable electrical resistors or capacitors. The automatic detection of the film cassette in the x-ray apparatus employs electromechanical means or units that are complicated to produce and are subject to wear.

To minimize these problems, it is known from German Patent Disclosure DE 43 32 428 A1 to detect the format of the film cassette by using photoelectric barriers. As such, a photoelectric barrier array in which a plurality of photoelectric barriers is arranged in two dimensions is provided. The accuracy of the format detection depends on the number of photoelectric barriers used. If a wide range of variation of formats is to be differentially detected, a large number of photoelectric barriers are thus necessary.

Accordingly, the known apparatuses for detecting the format of film cassettes are complicated to produce. Moreover, these apparatuses offer no flexibility for future adaptation to film cassette formats that may change in the future. Moreover, these apparatuses make it possible to detect only the format, but not the position, of an inserted film cassette.

OBJECT AND SUMMARY

The present invention is defined by the appended claims. This description summarizes some aspects of the present embodiments and should not be used to limit the claims.

An object is to disclose an apparatus for detecting both the format and the position of a film cassette inserted into the apparatus that is substantially uncomplicated to produce and to handle and that can moreover be used flexibly for a plurality of cassette formats and positions.

One aspect is to disclose an apparatus into which a film cassette can be inserted and which has a distance sensor for contactless measurement of a distance. The distance sensor may be disposed such that a distance from the distance sensor to an inserted film cassette can be measured.

A use of the contactless measurement sensors may be advantageous in that no significant wear may occur in conjunction with the measurement. Moreover, the contactless measurement may function independently of the placement of the film cassette in direct contact with a mechanical measuring unit, which makes handling upon insertion of the film cassette less complicated. Measuring a distance moreover offers another advantage that within the measurement range of the measurement sensor, continuously changing distances can be detected substantially flexibly. In particular, there may be no need to position the film cassette within a measurement field that is predetermined for instance by photoelectric barriers. Further, distance sensors are inexpensive and can be mounted in an uncomplicated way in the apparatus.

In an advantageous feature, the apparatus may be embodied to be mounted in a catapult frame drawer for an x-ray system. As such, the catapult frame drawer can be expanded in modular fashion via the apparatus.

In a further advantageous feature, the apparatus may be embodied as a catapult frame drawer for an x-ray apparatus. As such, corresponding advantages can be exploited to excellent effect, particularly in the field of x-ray systems, in which work must often be done under great time pressure and with great flexibility.

In a further advantageous feature, the apparatus may be embodied in such a way that a film cassette can be inserted in a position that is variable in terms of a direction in space, and that a first distance sensor may be disposed such that the distance of an inserted film cassette in the aforementioned direction in space can be measured in contactless fashion. As a result, the advantageous feature is attained when the film cassette can be positioned un-problematically in terms of the aforementioned direction in space. The film cassette can be inserted and visually positioned by a human operator, i.e., "by eye" or by eyeballing the insertion, and need not be mounted on mechanical guides or the like. As such, the handling upon insertion of film cassettes is made substantially easier. At the same time, via the distance sensor, the apparatus can detect the position of the film cassette and thus can recognize incorrect positioning. On one hand, depending on a requirement for precision in the positioning, an experienced operator will be capable of visually positioning the film cassette substantially exactly, so that a problem of incorrect positioning will occur correspondingly infrequently. On the other hand, incorrect positioning can be reliably detected by the distance sensor. As a result, faulty images, which entail unnecessary costs and exposures to x- rays, can be minimized.

In a further advantageous feature, the apparatus has a second distance sensor for contactless measurement of a distance, and the second distance sensor may be disposed opposite the first distance sensor and in such a way that the distance of an inserted film cassette in the aforementioned direction in space and in the direction opposite the first distance sensor can be measured in contactless fashion. As such, there is the advantage that in the aforementioned direction in space, not only the position of the film cassette but also its dimension can be measured, since the distance sensors are disposed opposite one another and therefore also measure the distance to opposite sides of the film cassette. The opposed disposition of two distance sensors thus make it possible to detect the format of an inserted film cassette.

In a further advantageous feature, the apparatus has a further distance sensor for contactless measurement of a distance, and the further distance sensor is disposed such that the distance of an inserted film cassette perpendicular to the aforementioned direction in space can be measured in contactless fashion. As such, the advantageous feature is that the location of one side of the film cassette can be measured in a second direction in space and then used for two-dimensional detection of both position and format.

In a further advantageous feature, the apparatus has an electronic evaluator, which is connected to the distance sensor or sensors in such a way that it can receive a distance signal, dependent on a measured distance, from the distance sensor or sensors. Via the electronic evaluator, a position signal dependent on the distance signal or signals can be generated, which is dependent on a dimension and/or the position of an inserted film cassette. The position signal of the electronic evaluator can be used, for instance, to indicate the correct positioning of the film cassette. If the apparatus is a catapult frame drawer, then the position signal can indicate the correct positioning despite a closed catapult frame drawer.

In a further advantageous feature, the apparatus is part of an x-ray system which has a control unit. The control unit may be connected to the electronic evaluator in such a way that it can receive the position signal from the electronic evaluator. As such, the x-ray system can be controlled as a function of the correct position and of the format of the film cassette. For example, if the film cassette is positioned incorrectly, needless exposures can be avoided because the control unit allows exposures to be made only when the film cassette is correctly positioned, or x-ray images in formats that do not match the format of the inserted film cassette can be prevented.

Illustrative and exemplary embodiments of the invention are described in further detail below with reference to and in conjunction with the figures.

DETAILED DESCRIPTION

Figure 1:
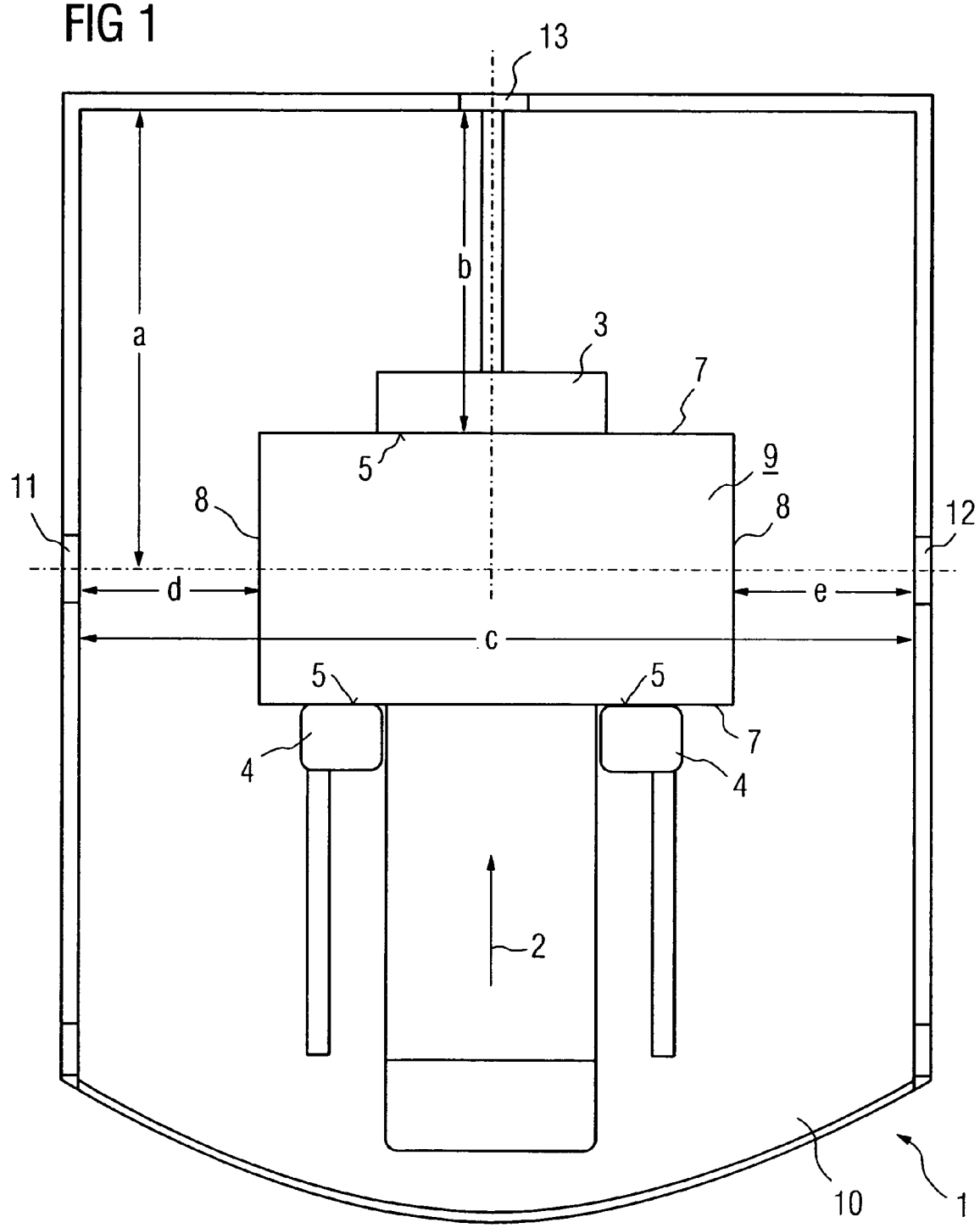
FIG. 1 is a schematic illustrating a catapult frame drawer with format and position detection for film cassettes.

In FIG. 1, a catapult frame drawer 1 for an x-ray system is shown in plan view. The catapult frame drawer can be integrated for instance with a patient examination table of the x-ray system to be pulled out and pushed in like a drawer. An x-ray film cassette 9 is inserted into the catapult frame drawer 1. The x-ray film cassette 9 is provided to capture and create an x-ray image of a patient or object disposed above it, not shown in the drawing, who or which is penetrated by x-radiation from an x-ray beam source, also disposed above it and also not shown. The x-radiation, after passing through the patient or object to be examined, exposes an x-ray- sensitive film located in the film cassette 9.

To obtain a desired image portion for the x-ray, the film cassette 9 may need to be inserted into the catapult frame drawer 1 in a defined position. The film cassette 9 is held in the defined position by a rear clamping jaw 3 and front clamping jaws 4. The clamping jaws 3, 4 have clamping faces 5, which are engaged with or pressed against the end faces 7 of the film cassette 9. As such, the cassette 9 is fastened in place by way of its end faces 7 pressed against the clamping jaws 3, 4 in such a way that the cassette 9 does not move when the catapult frame drawer 1 is pushed in and pulled out.

The clamping jaws 3, 4 are guided by a mechanism, not shown in the drawing but disposed below the catapult frame drawer 1, in such a way that the film cassette 9, regardless of its dimensions, is fastened in place centrally in terms of the longitudinal direction of the catapult frame drawer 1. This central position is represented in the drawing by dashed lines.

In inserting the film cassette 9, an operator may merely assure that the film cassette 9 comes to rest between the clamping jaws 3, 4, so that the clamping jaws 3, 4 can engage the end faces 7 of the cassette and fasten them in place. With respect to the longitudinal direction of the catapult frame drawer 1, the position of the film cassette 9 is therefore substantially fixedly specified, while with respect to the direction in space perpendicular to it, this position is variable. No clamping jaws or mechanical guide mechanisms that would fasten or position the cassette 9 in the latter perpendicular direction are provided. Although, the free positionability in this latter direction in space may make insertion easier, a possibility of incorrect positioning may be present.

The catapult frame drawer 1 has a first distance sensor 11, shown on the left, which includes a measurement device for contactless measurement of a distance. The measurement device can for instance be an infrared detector or an ultrasound detector. The distance sensor 11 is disposed in the catapult frame drawer 1 to measure a distance to a side face 8 of the cassette, that is, the side face 8 oriented toward it, in a contactless fashion. This distance is marked d in the drawing. The distance sensor 11 may enable continuous measurement of the distance for an arbitrary positioning of the film cassette 9. On the condition that the format of the cassette 9 may be known, by measuring the distance "d," one may also derive a position of the cassette 9 in the direction in space perpendicular to the longitudinal direction of the catapult frame drawer 1.

The catapult frame drawer 1 has a second distance sensor 12, which is disposed on a side opposite the first distance sensor 11. The second distance sensor 12 likewise functions on the basis of a measurement device that detects distances in contactless fashion. The distance sensor 12 may be disposed to measure a distance in a direction opposite the distance sensor 11 described above, and therefore may detect a distance to the other side face 8 of the cassette located opposite the previous one. The detected distance is marked "e" in the drawing. By measuring the distances "e" and "d," both the dimension and the position of the film cassette 9 in the direction in space that is transverse to the longitudinal direction of the catapult frame drawer 1 can be derived, on the condition that a dimension of the catapult frame drawer 1 in this direction in space is known. This catapult frame drawer dimension is marked "c" in the drawing.

From the above introduced measured distances, the dimension of the cassette may be obtained as follows:

$$\text{cassette width} = (c/2 - d) + (c/2 - e).$$

and the displacement of the cassette 9 relative to the center of the catapult frame drawer in this direction is:

displacement of cassette center=$(d-e)/2$.

The distance sensors 11, 12 operating in contactless fashion thus make possible the detection of the position and dimensions of the cassette 9 in a substantially wear-free manner and with substantial flexibility in terms of the distances that can be measured.

The catapult frame drawer 1 has a third distance sensor 13, which likewise operates on the basis of a contactless measuring device. The distance sensor 13 may be disposed to measure a distance in the longitudinal direction of the catapult frame drawer 1 in contactless fashion. The distance sensor 13 serves to measure the distance to the end face 7 of the cassette 9. This distance is marked "b" in the drawing. The cassette 9 may be fastened in place centrally by the clamping jaws 3, 4. The distance between the distance sensor 13 and the center of the cassette is marked "a" in the drawing. By measuring the distance "b" and on the condition that the distance 'a' is known, a dimension of the cassette 9 in the longitudinal direction of the catapult frame drawer 1 can be derived. The longitudinal dimension of the cassette 9 can be expressed as:

lengthwise cassette dimension=$(a-b)*2$.

The contactless measurement by the distance sensor 13, in the loading construction described, thus enables substantially wear-free measurement of continuously varying cassette dimensions in the longitudinal direction.

Based on the results of the measurements of all the distance sensors 11, 12, 13 described, both the format and the position of the film cassette 9 can thus be derived. The distance sensors 11, 12, 13 can either be fixedly integrated with the catapult frame drawer 1 or placed in modular fashion in the drawer 1, or mounted on its outer edge.

Figure 2:
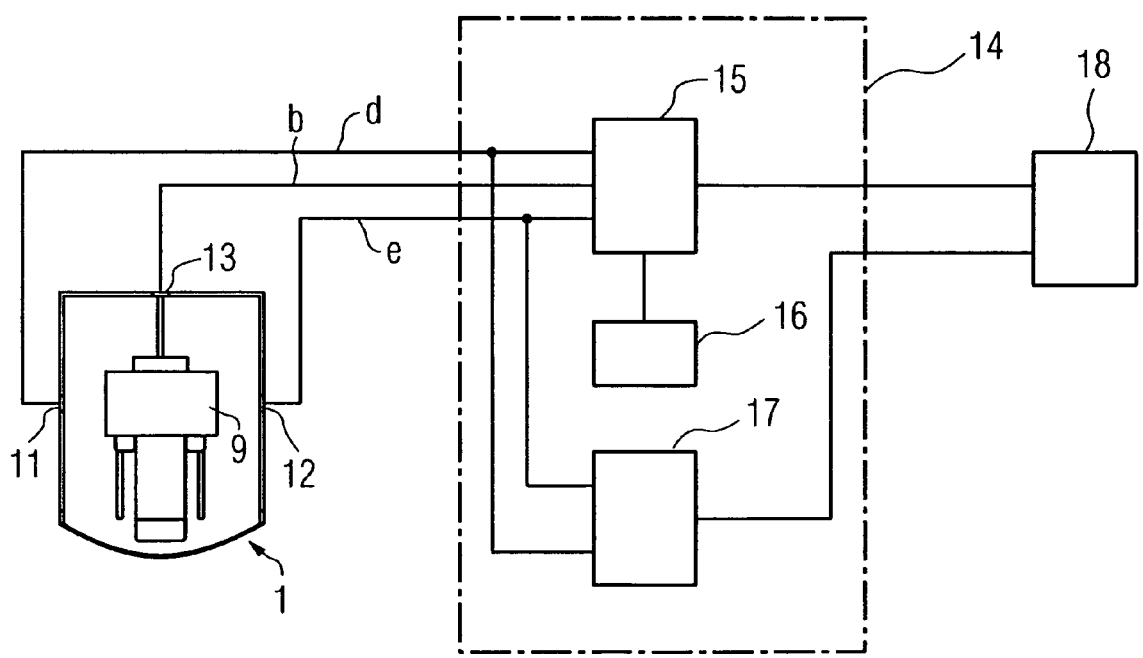
FIG. 2 is a schematic illustrating the catapult frame drawer of FIG. 1 with an electronic evaluator.

In FIG. 2, the above-described catapult frame drawer 1 is shown in conjunction with an electronic evaluator 14 and control unit 18 for an x-ray system. The components shown may be part of an x-ray system; for instance, the catapult frame drawer 1 can be integrated with the patient examination table of the x-ray system. The electronic evaluator 14 can be integrated with either the catapult frame drawer 1 or the patient examination table or the rest of the x-ray system.

The catapult frame drawer 1 with the inserted x-ray cassette 9 has—as described above—distance sensors 11, 12, 13. The distance sensors 11, 12, 13 each output or communicate an electrical signal, dependent on the particular distance measured, to the electronic evaluator 14. In the drawing, the lines by which the distance sensors 11, 12, 13 are connected to the electronic evaluator 14 are identified by the same designations as the respectively measured distance, namely b, d, and e. The electronic evaluator 14 may serve to determine or ascertain the cassette format and position using the sensor signals. As such, the electronic evaluator 14 may have a format ascertaining device 15, to which all three sensor signals are sent.

In addition to the sensor signals, the format ascertaining device 15 requires information, as described above, about the dimensions c, and a of the catapult frame drawer 1. To obtain the dimensional information, the format device 15 may have access to a memory device 16 in which data is stored. The memory device 16 may be part of the electronic evaluator 14, as shown in the drawing, but since it includes catapult frame drawer-specific data, it can also, along with the distance sensors 11, 12, 13, be integrated with the catapult frame drawer 1.

The format ascertaining device 15 may derive the cassette dimensions from the signals of the distance sensors 11, 12, 13 and from the information it obtains from the memory device 16, to generate a format signal that is dependent on the cassette dimensions. The format signal may then be made available as an output signal. The format signal can be sent to the control unit 18 so as to be taken into account in controlling the x-ray system. For instance, taking x-rays in formats that do not match the format of the inserted x-ray film cassette 9 can be minimized.

The electronic evaluator 14 furthermore has a position ascertaining device 17, which serves to ascertain the position of the inserted x-ray film cassette 9. Definitive position information may be whether the x-ray film cassette 9 is positioned centrally in the catapult frame drawer 1, which may be the case if the distance sensors 11, 12 each measure identical distances d, e. The position ascertaining device 17 therefore receives only the output signals of the distance sensors 11, 12, but not information on the width c of the catapult frame drawer 1. From these two signals, the position ascertaining device 17 derives a position signal which corresponds to a possible displacement of the film cassette 9 relative to the catapult frame drawer center. The position device 17 may output the position signal as an output signal and send it to the control unit 18. The control unit 18 can control the x-ray system as a function of the position signal; for instance, the taking of an x-ray can be minimized if the x-ray film cassette 9 is not inserted centrally.

If there were only a single distance sensor 11, 12, 13 available for measurement in a direction perpendicular to the longitudinal direction of the catapult frame drawer 1, then information about the displacement of the film cassette 9 could be obtained only by using the one distance d and the width c, on the condition that the width c is known. In that embodiment, however, the position ascertaining device 17 would have to have access to the information about the width c, which is not shown in the drawing.

The invention claimed is:

1. An apparatus configured for an insertion of a film cassette, the apparatus comprising a fixture operable to retain the film cassette in a position within the apparatus where the position is (1) completely variable and unencumbered by any mechanical guides in terms of one direction in space with respect to a first and a second wall of the apparatus and (2) fixed in terms of a second direction;

a first distance sensor that measures a first distance "d" from a first wall of the apparatus to a first side of the inserted film cassette in a contactless manner;

a second distance sensor that measures a second distance "e" from a second wall of the apparatus to a second side of the inserted film cassette in a contactless manner; and a processor that derives a format of the inserted film cassette and/or a position of the inserted film cassette within the apparatus as a function of the contactlessly measured first distance d and second distance e.

2. The apparatus of claim 1 wherein the apparatus is mountable in a catapult frame drawer for an x-ray system.

3. The apparatus of claim 1 wherein the apparatus comprises a catapult frame drawer for an x-ray system.

4. The apparatus of claim 1, wherein the film cassette is an x-ray imaging film cassette.

5. The apparatus of claim 1, wherein the second distance sensor is disposed in a location on the apparatus opposite the first distance sensor, such that the second distance e is measured in contactless manner in a direction opposite the first distance d.

6. The apparatus of claim 1, wherein a third distance sensor is disposed on the apparatus such that a third distance "b" from the third distance sensor to the inserted film cassette in a direction perpendicular to the one direction in space is measured in contactless manner.

7. The apparatus of claim 1, wherein the second distance sensor is disposed in a location on the apparatus such that the second distance e from the second distance sensor to the inserted film cassette in a direction perpendicular to the one direction in space is measured in contactless manner.

8. The apparatus of claim 1, further comprising an electronic evaluator operably connected to at least one of the first and second distance sensors to receive at least one distance signal corresponding to a distances measured by at least one of the first and second distance sensors, such that the electronic evaluator generates a position signal, resulting from the at least one distance signal, which is dependent on a dimension and a position of the inserted film cassette in the apparatus.

9. The apparatus of claim 1, wherein the processor is operable to derive a cassette width from the distances d and e, measured in a traverse direction to a longitudinal length of the apparatus, and from a width "c" of the apparatus in the traverse direction as follows:

cassette width=$(c/2-d)+(c/2-e)$.

10. The apparatus of claim 1, wherein the processor is operable to derive a displacement of a center of the inserted film cassette in the traverse direction to the longitudinal length of the apparatus that is derived as follows:

displacement of cassette center=$(d-e)/2$.

11. The apparatus of claim 1, wherein when a third distance sensor measures a distance "b" to a third side the inserted film cassette, and a distance between the third distance sensor and the center of the inserted film cassette is equal to "a", then the processor is operable to derive a dimension of the inserted film cassette in the longitudinal direction of the apparatus that is derived as follows:

longitudinal cassette dimension=$(a-b)*2$.

12. An x-ray system comprises an apparatus configured for an insertion of a cassette, the apparatus comprising:
a fixture operable to retain the cassette in a position within the apparatus where the position is free of any mechanical guides in terms of a direction in space with respect to a wall of the apparatus such that the position is completely variable an entire distance from at least one of an end or a side face of the inserted cassette to the wall;
a first and a second distance sensor each respectively operably measuring in a contactless manner a distance from a predetermined location on the apparatus to the inserted cassette, the first distance sensor contactlessly measures a distance "d" to a first side of the inserted cassette and the second distance sensor contactlessly measures a distance "e" to a second side of the inserted cassette; and
a processor that derives a displacement of the inserted cassette relative to a center of the apparatus as a function of the contactlessly measured distances d and e.

13. The x-ray system of claim 12 further comprising a control unit, wherein the control unit directs the taking of x-rays based upon a format signal, the format signal being dependent upon cassette dimensions of the inserted cassette determined using the signals received from the first and second distance sensors.

14. The x-ray system of claim 12, wherein the apparatus comprises a catapult frame drawer for an x-ray system and the processor is operable to derive a cassette width from the distances d and e, measured in a traverse direction to a longitudinal length of the apparatus, and from a width "c" of the apparatus in the traverse direction as follows:

cassette width=$(c/2-d)+(c/2-e)$.

15. A method of inserting a cassette, comprising:
inserting the cassette into an apparatus to a variable position that is (1) fixed in a first direction within the apparatus and (2) unencumbered by any guides in a second direction such that the cassette is freely positionable in the second direction an entire distance from a face of the cassette to the wall;
contactlessly determining (1) a first distance "d" from a first wall of the apparatus to a first side of the cassette and (2) a second distance "e" from a second wall of the apparatus to a second side of the cassette after the cassette has been inserted into the apparatus; and
determining the position of the cassette enclosed within the apparatus as a function of the contactlessly determined first distance d and second distance e.

16. The method of claim 15, comprising determining the format of the cassette enclosed within the apparatus as a function of the contactlessly determined first distance d and second distance e, and information stored in a memory unit.

17. The method of claim 15, comprising correctly positioning the cassette within the apparatus when it is determined that the cassette is incorrectly positioned within the apparatus, wherein the apparatus is an x-ray system such that correctly positioning of the cassette alleviates needless radiation exposure to a patient.

18. The method of claim 15, wherein the apparatus comprises a catapult frame drawer for an x-ray system and is operable to indicate correct positioning of the film cassette despite the catapult frame drawer being closed.

* * * * *